3,268,388
MANUFACTURE OF CALCIUM CARBONATE
Harry D. Bauman, Glen Rock, and Roger S. Williams, York, Pa., assignors to P. H. Glatfelter Company, Spring Grove, Pa., a corporation of Pennsylvania
Filed Aug. 20, 1963, Ser. No. 303,275
20 Claims. (Cl. 162—30)

This invention relates to the manufacture of calcium carbonate by reacting calcium hydroxide and an alkali metal carbonate, most commonly sodium carbonate. Such a reaction is commonly referred to as causticizing or causticization. Our invention is adapted to the preparation of bright, white $CaCO_3$ of fine particle size, suitable for use as a filler or in coatings, and is uniquely suited to the production of such high brightness $CaCO_3$ from the hot green liquors of the sulfate (kraft) pulping process.

The process of this invention will continuously produce from lime and $Na_2CO_3$ a solution of high causticity, containing NaOH and $Na_2CO_3$, while simultaneously producing high quality $CaCO_3$ which, by variations in the process as will be made clear in the embodiment, can be produced in a form suitable for application in a wide variety of fields where $CaCO_3$ is now used.

The causticizing of $Na_2CO_3$ with $Ca(OH)_2$ is carried out in various ways, but heretofore when the primary objective has been to produce $CaCO_3$ for use as a filler or in coatings, the methods used have been batch processes. Moreover, because the chemical reaction involved $$Ca(OH)_2 + Na_2CO_3 \rightleftharpoons CaCO_3 + 2NaOH$$

is one which does not take place almost instantaneously as do many inorganic reactions, it is necessary in the batch processes to allow reaction times of at least one hour, and frequently much longer, to obtain good yields of $CaCO_3$. A further difficulty encountered is that a chemical equilibrium is reached in the batch processes so that it is impossible to attain complete conversion of $Ca(OH)_2$ and $Na_2CO_3$ to $CaCO^3$ and NaOH. Indeed, when $Ca(OH)_2$ and $Na_2CO_3$ solutions are mixed in stoichiometric proportions the conversion to $CaCO_3$ and NaOH is only from 85 to 88% complete at the end of one hour and the system is so nearly in chemical equilibrium, we have found that allowing the reaction to proceed for three hours effects less than 95% conversion to $CaCO_3$ and NaOH.

In order to push the chemical equilibrium to the right and increase the conversion of $Na_2CO_3$ to NaOH, it is common practice in the batch processes to use a quantity of lime in excess of that stoichiometrically required to react with the $Na_2CO_3$. The $CaCO_3$ produced is thus always seriously contaminated with free $Ca(OH)_2$; when stoichiometric quantities are used, by unconverted $Ca(OH)_2$ and when excess lime is added, by the excess itself. It is then common procedure to separate and treat the $CaCO_3$—$Ca(OH)_2$ mixture with a fresh portion of $Na_2CO_3$ solution to convert the contaminant $(Ca(OH)_2$ to $CaCO_3$. A second separation step is then required to obtain the $CaCO_3$.

An important object of this invention is to produce high quality $CaCO_3$ from $Ca(OH)_2$ and $Na_2CO_3$ solution by a continuous method in which $CaCO_3$, essentially free of unreacted lime, is produced in a relatively short time, in some instances only a few minutes. In essence we accomplish this objective by continuously subjecting $Ca(OH)_2$ to the action of numerous, successive, small portions of $Na_2CO_3$-containing solution while simultaneously removing the NaOH-enriched solution produced by the reaction $$Ca(OH)_2 + Na_2CO_3 \rightarrow CaCO_3 + 2NaOH$$

Since the NaOH is continuously removed from contact with the $CaCO_3$ there is little opportunity for the reverse reaction $$CaCO_3 + 2NaOH \rightarrow Ca(OH)_2 + Na_2CO_3$$

to occur and the troublesome equilibrium encountered in the batch processes does not occur. Thus we have found that as the $Ca(OH)_2$ is treated with successive, small portions of $Na_2CO_3$-containing solution, conversion of $Ca(OH)_2$ to $CaCO_3$ occurs rapidly and completely. We have found that utilizing the continuous process of this invention, essentially complete conversion of $Ca(OH)_2$ to $CaCO_3$ is accomplished in a total time of less than 15 minutes, as contrasted to one to several hours by the batch processes heretofore employed.

The technological advantages of continuous processes over batch processes are well known. No elaborate or complicated equipment is needed by which to effect the continuous, rapid conversion of $Ca(OH)_2$ to $CaCO_3$ by the present invention. Further, since the finished $CaCO_3$ is washed free of alkali on such device as is required, in accordance with this invention, there is no need for a separate washing operation.

It will be readily apparent on consideration of the preferred embodiments as set forth in the specification and drawings, in which FIGURE 3 is a flow diagram of the application of this invention, that the use of our continuous system effects valuable simplification and economics over batch processes. In a batch process, large tanks are needed in which lime and $Na_2CO_3$ solution can be allowed to react, with constant agitation, for times usually in excess of one hour. Time must then be allowed for the $CaCO_3$ to at least partially settle, the $CaCO_3$ must be separated from the caustic solution, and retreated with fresh $Na_2CO_3$ to destroy the unreacted $Ca(OH)_2$ in the $CaCO_3$, the $CaCO_3$ must then again be separated, usually on a filter, and washed free of caustic. The need for large reaction tanks, for lengthy reaction and settling times and for transferring of the $CaCO_3$ is avoided by this invention, thereby realizing valuable savings in time, space and investment.

Another important object of this invention is to produce pigment $CaCO_3$ of high brightness from the green liquor of the sulfate pulping process, a solution containing principally $Na_2S$ and $Na_2CO_3$. While other prior methods are capable of producing high brightness $CaCO_3$ from substantially pure $Na_2CO_3$ solutions, and from the green liquor of the soda pulping process which contains no $Na_2S$, such prior methods (e.g., see U.S. Patents 2,979,380; 2,140,375 and 2,062,255) when applied to the green liquor of the sulfate process produce a $CaCO_3$ which posesses an irremovable characteristic greenish hue. Bleaching or other processing has little effect in eliminating this coloration which renders the $CaCO_3$ unsuited for use in many applications which require a pure white, highly bright $CaCO_3$. We have found that by the process of this invention, white $CaCO_3$ of brightness in excess of 95% (as compared to MgO=100%) is readily produced from sulfate green liquor. This is a discovery of great value to the sulfate pulping industry which manufactures 75% of the chemical pulp produced, since it enables a sulfate pulp mill to manufacture simply and at low cost a high quality $CaCO_3$ suitable for use even in white, high brightness papers. The absence of detrimental color in the $CaCO_3$ produced by this invention from sulfate green liquor is a benefit probably derived from the short time the $CaCO_3$ is in contact with the green liquor during the continuous process of manufacture.

U.S. Patent 2,062,255, issued November 24, 1936, discusses in general terms the need to causticize below 70° C. in order to produce slow settling $CaCO_3$ particles of very fine size by a conventional batch process. U.S. Patent 2,979,380 gives detailed data on the specific surface of $CaCO_3$ produced by causticization in cold solutions and essentially teaches the need to stay below 40° C. in order to produce pigment $CaCO_3$ with specific surface above 35,000 cm.$^2$/g. As will be set forth in the description, we have found that using the process of this invention, high quality, finely divided $CaCO_3$ can be produced at temperatures well above 70°.

We have further found that the specific surface of the $CaCO_3$ produced by this invention is not appreciably changed by small temperature changes in the $Na_2CO_3$-containing solution used as a reactant for $Ca(OH)_2$. These findings are of considerable value when $CaCO_3$ is manufactured from the green liquor of a pulping process, because the green liquor is produced and maintained hot and by our continuous process it is not necessary to cool the green liquor. Also, temperature fluctuations in the green liquor do not appreciably alter the characteristics of the $CaCO_3$ produced. Moreover, because of the short time required for the continuous process, there is little heat lost from the causticized solution. It is not intended to imply that the process of this invention is limited to elevated temperatures, but by this invention distinct advantages over existing processes in fineness of particle size, purity and whiteness are realized when $CaCO_3$ is to be made from a hot process liquor.

In the application of the ideas of this invention, the first step is to continuously mix lime with an alkali metal carbonate-containing aqueous solution under conditions such that the lime and carbonate-containing solution are thoroughly and intimately mixed and held in contact with each other for a short time. Preferentially the quantity of lime is materially in excess of that stoichiometrically required to react with the carbonate present, although any convenient $Ca(OH)_2:Na_2CO_3$ ratio may be used. The amount of carbonate reacted at this point is relatively small, i.e., less than about 80% of that originally introduced and as will appear hereinafter the conversion of $Ca(OH)_2$ to $CaCO_3$ need only be initiated, but need not be carried out to any great extent. This step will be referred to as the initial reaction period and the system, whatever its physical nature, in which the initial reaction takes place will be referred to as the initial reaction chamber.

From the initial reaction chamber, a slurry, the solid component of which is now a mixture of $Ca(OH)_2$ and $CaCO_3$, is continuously transferred to a mechanical device designed to continuously carry out three distinct operations. The first operation consists in separating the solid phase from the liquid phase and forming the solid phase into a layer or mat through with a carbonate-containing solution can pass; in the second operation, an alkali metal carbonate-containing solution is applied to the solid layer or mat and caused to pass slowly through the solids thereof until the conversion of $Ca(OH)_2$ to $CaCO_3$ is complete; and the third operation comprises washing the $CaCO_3$ with water or other wash liquid.

It is not our intent to become involved in the details of the mechanical device used. A rotary vacuum filter having a speed of 6–10 minutes per revolution is an obvious example of a mechanical device which can readily be adapted to the process of this invention. In our experimental work, filter techniques were used, but the use of such terms as mat, cake, and filtrate in the description and claims is in no wise meant to limit the application of the ideas of this invention to filter techniques. The ideas of this invention are independent of the device or combination of devices utilized to carry out the three operations described above; obviously, for example, the cake from one filter could be removed, reslurried and transferred to a second filter for further treatment, and this repeated as many times as desired, without in any way avoiding the generic concept involved in this invention. It is clear too that the carbonate-containing solution can be recycled through the cake or cakes until its hydroxide content reaches a high level.

Alternately, the solutions enriched in hydroxide by use in any stage of the process of this invention can be treated with any $CO_2$-containing gas, such as the gas from a lime kiln or flue gas from a power boiler, thereby converting the hydroxide back to carbonate. The resulting solution, its carbonate content restored, may then be re-used. Such carbonation and reuse in the process of this invention in no way avoids the generic concept involved, but comprises an application of established technique for preparing an alkali metal carbonate.

We have found that, as the result of the short initial reaction, the solid mat produced by the continuous mechanical device remains porous so that the carbonate solution readily passes through. If a lime slurry, without the short initial reaction, is formed as a mat on a filter and $Na_2CO_3$ solution applied as in our idea, the mat immediately changes to a hard, non-porous, nearly impervious solid which remains as essentially unreacted $Ca(OH)_2$ through which the $Na_2CO_3$ solution passes only with great difficulty.

While the initial reaction period is essential to give a solid mixture which works well on the above discussed continuous mechanical device, it is an important advantage of our process that conditions difficult to control precisely during the initial reaction period can vary greatly with little or no effect on the process. We have observed no significant differences in filterability of the solid mixture between one and ten minutes retention time in the initial reaction chamber. Since the alkali metal carbonate solution and lime will be continuously and automatically fed into the initial reaction chamber, variations in these feed rates will alter the $$Ca(OH_2:Na_2CO_3$$

ratio and, perhaps, the residence time in the initial reaction chamber. Tables 1, 2 and 3 show how little the chemical process in the initial reaction is affected by relatively large changes in $Ca(OH)_2:Na_2CO_3$ ratio and residence time in the initial reaction chamber.

Tables 1, 2 and 3 give the $Ca(OH)_2:Na_2CO_3$ ratio in chemical equivalents, i.e., a 1:1 ratio means 74 g. $Ca(OH)_2$ to 106 g. $Na_2CO_3$. In Tables 1 and 2 residence time in the initial reaction chamber was 5 minutes and the temperature was 70° C. The carbonate-containing solution in Tables 1, 2 and 3 was a typical sulfate green liquor containing: $Na_2CO_3$, 74.8 g./l.; $Na_2S$, 21.7 g./l.; and $NaOH$, 31.0 g./l.; all quantities given as $Na_2O$.

TABLE 1

[5 min. initial reaction time. Temperature 70° C.]

| $Ca(OH)_2:Na_2CO_3$ | Percent $Na_2CO_3$ converted to NaOH | Percent $Ca(OH)_2$ converted to $CaCO_3$ |
| --- | --- | --- |
| 0.5:1 | 45.0 | 90.0 |
| 0.75:1 | 62.0 | 83.0 |
| 1:1 | 61.0 | 61.0 |
| 2:1 | 61.0 | 30.5 |
| 2.5:1 | 63.4 | 25.3 |
| 3:1 | 61.8 | 20.6 |
| 3.5:1 | 63.4 | 18.1 |
| 4:1 | 64.3 | 16.0 |

TABLE 2

[5 min. initial reaction time. Temperature 70° C.]

| Ca(OH)$_2$:Na$_2$CO$_3$ | Analysis of liquid phase after initial reaction g./l. as Na$_2$O | | |
|---|---|---|---|
| | Na$_2$CO$_3$ | NaOH | Na$_2$S |
| 0.5:1 | 41.2 | 64.6 | 22.2 |
| 0.75:1 | 28.4 | 77.4 | 22.2 |
| 1:1 | 29.2 | 75.0 | 22.3 |
| 2:1 | 29.2 | 75.0 | 22.3 |
| 2.5:1 | 27.4 | 76.0 | 21.3 |
| 3:1 | 28.6 | 77.5 | 22.1 |
| 3.5:1 | 27.4 | 76.6 | 21.3 |
| 4:1 | 26.7 | 77.5 | 21.1 |

Table 3 gives the extent of conversion of Na$_2$CO$_3$ to NaOH and the analysis of the liquid phase in the initial reaction chamber at different time intervals for 2 different Ca(OH)$_2$:Na$_2$CO$_3$ ratios at a temperature of 70° C.

TABLE 3

| Time, min. | Ca(OH)$_2$:Na$_2$CO$_3$ | Percent Na$_2$CO$_3$ converted to NaOH | Analysis of liquid phase, g./l. as Na$_2$O | | |
|---|---|---|---|---|---|
| | | | Na$_2$CO$_3$ | NaOH | Na$_2$S |
| 1 | 3:1 | 53.4 | 34.8 | 70.1 | 21.4 |
| 3 | 3:1 | 60.6 | 29.5 | 80.3 | 19.5 |
| 5 | 3:1 | 61.8 | 28.6 | 77.5 | 22.1 |
| 10 | 3:1 | 63.4 | 27.4 | 77.5 | 20.5 |
| 1 | 4:1 | 56.6 | 32.5 | 67.9 | 20.6 |
| 3 | 4:1 | 60.6 | 29.5 | 70.7 | 20.7 |
| 5 | 4:1 | 64.3 | 26.7 | 77.5 | 21.1 |
| 10 | 4:1 | 64.3 | 26.7 | 77.2 | 21.3 |

From the data shown in Tables 1 to 3, we have concluded that there is little to be gained in the initial reaction from going above 2:1 in Ca(OH)$_2$ to Na$_2$CO$_3$ ratio nor beyond 5 minutes reaction time. It is also apparent from the data that the initial reaction has gone to a substantial degree in one minute; hence, the pumps and piping required to convey the mixture to the continuous mechanical device may suffice as the initial reaction chamber. Obviously going above 2:1 in the Ca(OH)$_2$ to Na$_2$CO$_3$ ratio will increase substantially the unreacted Ca(OH)$_2$ to be converted to CaCO$_3$ on the continuous mechanical device.

The advantages gained from the initial reaction are not realized by simply mechanically blending Ca(OH)$_2$ and CaCO$_3$ and putting the mixture on a filter for treatment with carbonate solution. Even when such a mixture is initially largely CaCO$_3$ and although the constituent CaCO$_3$ and Ca(OH)$_2$ are of essentially the same particle size, as soon as the carbonate solution is introduced the mat changes to the same sort of hard, impervious solid previously described, rendering conversion of Ca(OH)$_2$ to CaCO$_3$ impractical. This behavior contrasts markedly with that encountered after the initial reaction described in our invention, wherein we have found that even when conversion of Ca(OH)$_2$ to CaCO$_3$ is only initiated, 10% or less, a mixture of excellent filterability results.

We have found that a most important factor in determining the particle size and brightness of the CaCO$_3$ unique in the degree of its application to this invention is the nature and specific surface of the lime added to the initial reaction chamber. Indeed, at any given temperature in the initial reaction according to this invention, the specific surface of the lime affords a convenient and simple means to regulate the specific surface of the CaCO$_3$ and we have found, as shown in Table 4, that the specific surface of the CaCO$_3$ varies directly with the specific surface of the lime used in the process of this invention.

It is a well established phenomenon in analytical chemistry that allowing precipitated particles to remain in contact with the hot solution from which they were formed, brings about the growth of larger particles by agglomeration. This is what occurs in causticization reactions carried out at elevated temperatures and makes it impossible to produce fine pigment CaCO$_3$ from hot solutions of batch processes, as described in aforementioned U.S. Patent 2,062,255. A further difficulty arises in that the formation of agglomerates produces particles of various sizes over a wide range and such a heterogeneous mixture has a very poor filtering rate. It is logical then in the described continuous process, since time is too short to permit the growth of agglomerates, that the CaCO$_3$ produced from hot solutions should be finer than by a batch process and that it should have the homogeneity of particle size required for excellent filterability.

All CaCO$_3$ in Table 4, 5 and 7 was produced using typical sulfate green liquors. Table 4 shows how the specific surface of the CaCO$_3$ is controlled by the specific surface of the lime used, the temperature during the initial reaction period being the same in all cases.

TABLE 4

[5 min. initial reaction time. Temperature 70° C.]

| Specific surface of lime cm.$^2$/g.: | Specific surface of CaCO$_3$ cm.$^2$/g. |
|---|---|
| 28,900 | 22,900 |
| 35,000 | 28,000 |
| 56,000 | 36,000 |

It has been discussed previously and shown in Tables 1, 2 and 3 how little time and Ca(OH)$_2$:Na$_2$CO$_3$ ratio alter the chemical process in the initial reaction period. Table 5 shows that the particle size of the CaCO$_3$ is also little affected by these factors, Ca(OH)$_2$:Na$_2$CO$_3$ ratio again being given in chemical equivalents.

TABLE 5

[Specific surface of lime=28,900 cm.$^2$/g. Temperature 70° C.]

| Initial Reaction Time | Ca(OH)$_2$:Na$_2$CO$_3$ ratio | Specific Surface of CaCO$_3$, cm.$^2$/g. |
|---|---|---|
| 5 min | 1:1 | 22,900 |
| 15 min | 1:1 | 22,400 |
| 5 min | 2:1 | 21,000 |
| 15 min | 2:1 | 20,600 |

Specific surface has been taken as a convenient, quickly determined measure of particle size. We determined specific surfaces by a modification of the Lea and Nurse method as described by Pechukas and Gage in Industrial and Engineering Chemistry, Analytical edition, vol. 18, 370–373 (1946). It is well recognized that the numerical value obtained for specific surface shows considerable variation depending upon the method used. However for any given method the specific surface values are a useful comparative measure of the fineness of the material; the higher the specific surface, the finer the material and the lower the specific surface, the coarser the material. For CaCO$_3$, it can be shown that a specific surface of 10,000 cm.$^2$/g. is equivalent to an average particle size=2.2 microns; 20,000 cm.$^2$/g. to 1.1 microns; and 30,000 cm.$^2$/g. to 0.75 micron. The following specific surface values, as measured by the method we use, are given as comparative guides for evaluating the nature of the high quality CaCO$_3$ discussed in this description.

TABLE 6

| Material: | Specific surface range, cm.$^2$/g. |
|---|---|
| CaCO$_3$ (lime mud) as usually produced in the sulfate process | 7,000 to 10,000 |
| Commercial CaCO$_3$ for fillers in paper | 15,000 to 25,000 |
| Commercial CaCO$_3$ for use in paper coatings | 20,000 to 40,000 |

In Table 7, all initial reaction times were 5 minutes and all Ca(OH)$_2$:Na$_2$CO$_3$ ratios were 2:1. At the end of the initial reaction period the solids were transferred to a filter and the conversion of Ca(OH)$_2$ to CaCO$_3$ completed using sulfate green liquor maintained at the same temperature as during the initial reaction. Total reaction times in all cases were less than 15 minutes. The data in Table 7 again shows the regulating influence which the specific surface of the lime has on the fineness of the $CaCO_3$. It is clear also from these data that, by the process of this invention, $CaCO_3$ of sufficiently fine particle size for use as a filler or in coating can be prepared at elevated temperatures.

TABLE 7

| Temperature, °C. | Specific Surface of Lime, cm.²/g. | Specific Surface of $CaCO_3$, cm.²/g. |
| --- | --- | --- |
| 100 | 57,000 | 28,000 |
| 100 | 31,900 | 18,200 |
| 100 | 28,800 | 14,800 |
| 90 | 57,000 | 30,000 |
| 90 | 31,900 | 19,500 |
| 90 | 28,800 | 18,800 |
| 80 | 57,000 | 32,000 |
| 80 | 31,900 | 20,300 |
| 80 | 28,800 | 18,800 |
| 70 | 57,000 | 36,000 |
| 70 | 31,900 | 22,700 |
| 70 | 28,800 | 20,000 |
| 60 | 31,900 | 25,800 |
| 60 | 28,800 | 22,100 |

The process of this invention is unique, also, in affording a simple method to utilize combinations of different temperatures in the manufacturing process. This could be of important value to a pulp mill, for instance, whose green liquor is produced at 80° C. If it is desired to take advantage of the somewhat higher specific surface obtained at a lower temperature, say 60° C., it is practical to cool the small amount of green liquor required in the initial reaction chamber to 60° C., but utilize the larger part of the green liquor at 80° C. to complete the process.

The data shown in Table 8 were obtained using a typical sulfate green liquor, carrying out the initial reaction for 5 minutes with a $Ca(OH)_2:Na_2CO_3$ ratio of 2:1, at the temperature indicated. The solid mixture of $Ca(OH)_2$ and $CaCO_3$ was then transferred to a filter and the conversion of $Ca(OH)_2$ to $CaCO_3$ completed by passing through the solid cake fresh portions of the same green liquor at the temperature shown.

TABLE 8

| Temperature, °C. | | Specific Surface, cm.²/g. | |
| --- | --- | --- | --- |
| Initial Reaction | Liquor on Filter | Lime Used | $CaCO_3$ Produced |
| 50 | 70 | 56,600 | 36,400 |
| 60 | 90 | 28,000 | 22,200 |
| 60 | 80 | 28,000 | 22,600 |
| 50 | 90 | 58,000 | 33,300 |

In the preferred embodiment of this invention we use the type of previously slaked lime commonly known as "dry hydrate." Such hydrate is made by slaking CaO with water in approximately the ratio of 0.75 to 1 part of $H_2O$ to 1 part CaO, and after being ground, sieved or air floated a fine, dry powder is produced which contains substantially no CaO nor uncombined $H_2O$. We have found, contrary to past teachings in the art, these dry hydrates to be excellently suited to the production of fine pigment $CaCO_2$. We have preferred the use of dry lime hydrate over a $Ca(OH)_2$ slurry, or milk of lime, because much less water is introduced into the system and the dilution of the process liquors is thus minimized. The use of a dry hydrate readily permits the selection of one having a specific surface which will result in a final $CaCO_3$ of a desired particle size. For this reason, while unslaked CaO may be used in our process in the initial reaction chamber, it is detrimental when high quality $CaCO_3$ is desired and sacrifices the control which the use of lime of known specific surface gives. The product obtained with unslaked CaO is invariably very coarse and inferior.

Dry lime hydrates are made in various types of continuous hydrators in which by feeding in CaO and the desired quantity of water, a uniform dry hydrate is produced. In the manufacture of high quality $CaCO_3$ by the process of this invention, if it is desired to use CaO because of its lower cost compared to commercial dry hydrate, it is eminently practical to include a continuous hydrator as part of the process.

While lime slurries, or milk of lime, have the disadvantage of introducing dilution water into the system, they are equally as well adapted chemically to the process of this invention as are dry hydrates, and have two advantages over dry hydrates. It is well recognized, as a broad general principle, that the more water used in slaking CaO, the finer is the $Ca(OH)_2$ produced. Hence, slaking CaO in a large excess of water to produce a lime slurry, results in a very fine $Ca(OH)_2$, one of high specific surface. We have found, for example, that slaking 1000 g. of CaO in 5 l. of $H_2O$ results in a $Ca(OH)_2$ having a specific surface approaching 60,000 compared to a maximum of about 50,000 for dry hydrates. The slurry just described contained only about 24% solids, but we found that it could be dewatered mechanically to about 50% solids and this paste introduced into the continuous reaction chamber without losing the advantage of the high specific surface. The second advantage from the use of a lime slurry, rather than dry hydrate, is a somewhat higher brightness in the final $CaCO_3$ when a sulfate green liquor is used as the source of carbonate.

The above described differences using dry hydrate and lime slurry will be made more apparent by referring to Examples 1 and 2. In these examples a dry hydrate and a lime slurry produced from the same CaO were used to prepare $CaCO_3$ by the process of this invention. The substantial increase in specific surface and the small increase in brightness gained by using a lime slurry are illustrated.

An important advantage peculiar to our process, is that it makes possible the manufacture of white, high brightness $CaCO_3$ from sulfate green liquor. We have observed, however, that limes differ materially in their ability to yield high brightness $CaCO_3$, and we categorize limes as good or poor in this respect. We have been unable to establish with certainty what inherent characteristic distinguishes good limes from poor limes, but we have observed that good limes are themselves bright, white in color, are low in $Fe_2O_3$ and in acid insoluble materials. The only sure test, however, has been to use a lime in the process of this invention and measure the brightness of the $CaCO_3$ produced.

Relative to the difference between dry hydrate and lime slurry noted above with respect to brightness of the $CaCO_3$ produced, when using sulfate green liquor we have found the following. A good lime which yields a $CaCO_3$ of 95–97 brightness when used as a dry hydrate, will yield a 98–100 brightness $CaCO_3$ when used as a slurry; a poor lime hydrate which, under the same conditions employed with the good lime, yields 88–90 brightness $CaCO_3$, will yield 93–95 brightness $CaCO_3$ when used as a slurry. Invariably, we have found the difference between a good lime and a bad lime to be minimized by using them in slurry form.

Thus far we have described in detail the initial reaction period and have discussed the effect of time and temperature during this period, the effect of $$Ca(OH)_2:Na_2CO_3$$

ratio, the nature of the lime employed and the importance of the specific surface of the lime in controlling the specific surface of the $CaCO_3$. We have found only minor effects arising from varying the concentration of the carbonate solution or from varying the agitation during the initial reaction, probably because of the short time in the initial reaction chamber and the large excess of $Ca(OH)_2$ over $Na_2CO_3$. By the nature of the continuous process, agitation during the initial reaction must be at least thorough enough to cause intimate mixing of the lime and carbonate solution and to keep the slurry moving through the reaction chamber.

The initial reaction carried out as described in our invention comprises an important difference from the prior art and important advantages are thereby realized. We produce $CaCO_3$ of fine particle size and excellent brightness even at temperatures well above 70° C. rather than being limited to lower temperatures, e.g., 20° to 40°. As described in our embodiment, either dry lime hydrate or milk of lime can be used advantageously by simply admixing with carbonate solution without need for precise control over the rate of addition and without limitations on the concentration of the carbonate solution and on the $Ca(OH)_2$:$Na_2CO_3$ ratio. As carried out in our invention, the initial reaction does not involve the formation of a gel; indeed, by our process, it is impossible for a gel to form. In this connection it is to be noted that our process involves dispersions of solids in liquids which is the antithesis of gels, i.e., liquids dispersed in solids. This eliminates the need for careful admixing of reactants so as to permit gel formation and eliminates the time required by a quiescent period for the gel to form and age until 90% of the $Na_2CO_3$ is converted to NaOH and substantially all of the $CaCO_3$ has formed. According to our invention, the chemical conversions need only begin and should not exceed about 80% with respect to the alkali metal carbonate.

Regarding the operations of separating $Ca(OH)_2$ and $CaCO_3$ from the initial reaction mixture to form a cake and subsequently treating with carbonate solution to complete the conversion of $Ca(OH)_2$ to $CaCO_3$, the following discussion gives typical conditions. However, it is in no way meant that our invention should be limited to these conditions.

The first operation on the mixture from the initial reaction chamber comprises the separation of the liquid phase from the solid phase and in forming the solid phase into a layer or mat suitable for further treatment with an alkali metal carbonate solution. The liquid phase separated here will be of sufficiently high causticity for numerous intended uses, e.g., as a white liquor in a pulping process. We have shown in Tables 1, 2 and 3 that over a wide range the composition of the liquid phase is essentially independent of the $Ca(OH)_2$:$Na_2CO_3$ ratio and of the time after about 5 minutes or longer.

The second operation, following separation and formation of a $CaCO_3$—$Ca(OH)_2$ mixture as a cake, layer or mat, comprises treating the $Ca(OH)_2$—$CaCO_3$ mixture with further portions of an alkali metal carbonate solution to effect complete conversion of $Ca(OH)_2$ to $CaCO_3$. If this is done on a rotary vacuum filter, said second operation consists in applying the carbonate solution on the mat formed in the first operation. We have found that under 10 inches of vacuum, a filter cake from ¼ to ½ inch thick is readily formed in 15–30 seconds at 70° C. We have found also that the second operation on a filter must be done so that from 4–6 minutes are allowed for treatment of the cake with carbonate solution. The filtering characteristics of the cake, as a result of the initial reaction period, are so excellent that only 10–15 inches of vacuum are needed during this operation.

Where no recycling of the carbonate solution during the second operation is employed, we have found that the $Ca(OH)_2$ must be contacted with a minimum of 1.5 to 1.75 times the stoichiometric volume of the carbonate solution to complete the conversion of $Ca(OH)_2$ to $CaCO_3$. For example, in the initial reaction chamber a quantity of lime equivalent to 1000 gal. of carbonate solution is mixed with 500 gal. of carbonate solution. To ensure complete conversion to $CaCO_3$, the $Ca(OH)_2$ must be contacted with about 1750 gal. of carobnate solution so 1250 gal. must be applied during the second operation.

The recycle possibilities during the second operation are many and varied. However, when operated in conjunction with a sulfate pulp mill, the process of this invention may preferably be operated with little or no recycle. For example, assuming that the pulp mill is operating a conventional causticizing step and it is decided to manufacture high quality $CaCO_3$ equivalent to one-fourth the daily lime mud production, by our continuous process, one-eighth of the total green liquor after clarification is diverted to the initial reaction chamber and there mixed with lime equivalent to one-fourth the total green liquor. The liquid phase separated in the first operation on the filter closely approximates white liquor and can be sent directly to white liquor storage without need of clarification. Three-eights of the total green liquor is temporarily diverted to be used in the second operation on the filter and immediately returned, partially causticized, to the conventional causticization operation. One-half the green liquor goes to conventional causticization without being diverted for use. By the process of this invention, the pulp mill derives the great advantages of producing high quality $CaCO_3$ simply, continuously, and at low cost by a method integrated with its normal causticization operation and derives the further advantages that the load on its lime kiln is reduced 25% and the load on its white liquor clarification and its conventional causticization equipment is reduced 12.5%.

The capacity of a pulp mill to produce high quality $CaCO_3$ can be greatly increased by using green liquor only in the initial reaction. For the second operation on the mechanical device a carbonate solution, separate from the mill's green liquor—white liquor system, is used and as the carbonate in this solution is converted to hydroxide the carbonate is regenerated by well established carbonation techniques utilizing any available $CO_2$-rich gases. Clearly the continuous process of this invention can be utilized to advantage whatever the origin and treatment of the carbonate-containing solutions.

The third and final operation to be carried out by the continuous mechanical device is to wash the $CaCO_3$ free of alkali. This may be done with fresh water or a combination of weak process liquor and fresh water as conditions warrant. Rotary vacuum filters in operation washing lime mud have shown that this washing can be done effectively with small volumes of water.

We have found no difficulty, when using a filter to have a final cake of 50 to 60% solids. When a $Na_2CO_3$ solution or soda process green liquor has been used, the final cake will be a high brightness $CaCO_3$. When sulfate green liquor has been used, the final cake has a distinctive, typical green color. If this cake is made in accordance with this invention and it is dried at any convenient temperature near or above 100° C., the green color is completely and permanently destroyed, producing high brightness white $CaCO_3$.

When it is desired to avoid drying, as will frequently be the case, especially where $CaCO_3$ is produced by a pulp mill for use in an integrated paper mill, the cake is dispersed in a minimum of water and bleached. We have found that very small amounts of bleaching agents are required to develop high brightness and whiteness in the $CaCO_3$ made by our invention. Typically we have found that application of 0.3% available chlorine, based on the weight of $CaCO_3$, effects almost instant destruction of the green color at room temperature. The chlorine was applied as a hypochlorite solution.

In any event the greenish hue characteristic of calcium carbonate made from sulfate green liquor can be substantially eliminated by bleaching or roasting when it is made by the process of this invention. If made by prior methods, the greenish cast cannot be removed by roasting regardless of temperature or by bleaching regardless of the amount of chlorine used or by any other known means.

The difference previously cited between different limes is evident at the brightening and whitening stage also.

When using what we have called a poor lime, as much as 3–4 times the quantity of bleaching agent is required as with a good lime and yet the final $CaCO_3$ is less bright than with a good lime.

Inasmuch as these differences between a good lime and a poor lime can be best illustrated, FIGS. 1 through 3 of the drawings are now described.

Figure 1:
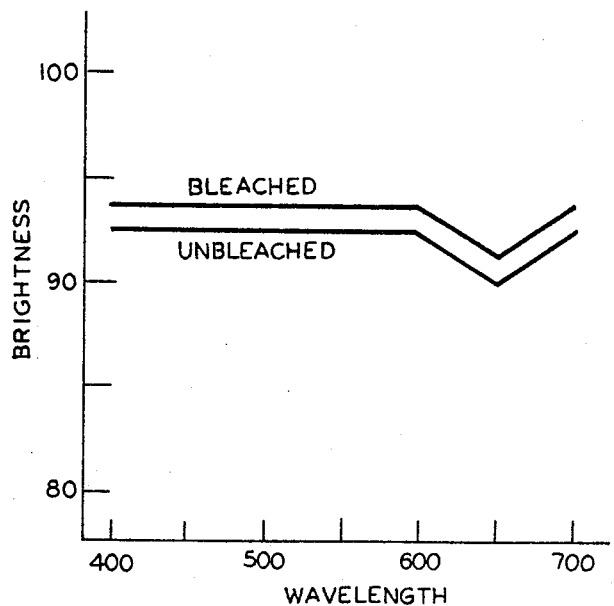
FIG. 1 is a graphic representation of the bleached and unbleached brightness (determined spectrophotometrically) of a $CaO_3$ made by the process of this invention from a poor lime.
Figure 2:
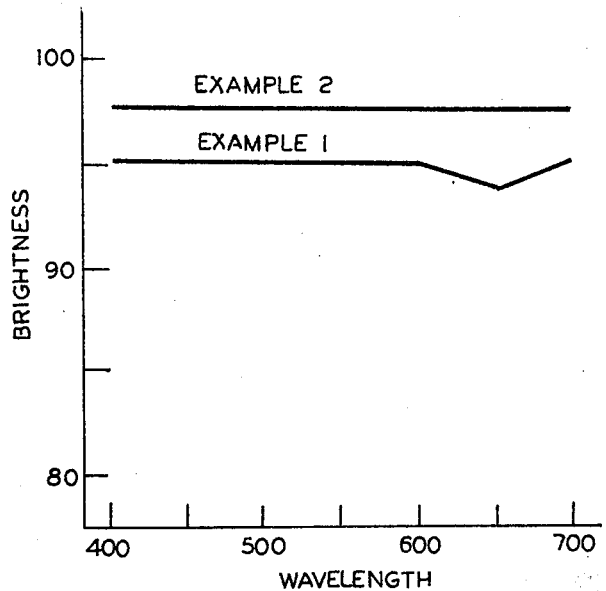
FIG. 2 is a graphic comparison of the bleached brightnesses (determined spectrophotometrically) of $CaCO_3$ made by the process of this invention, one using dry lime hydrate and the other using lime slurry.

FIG. 1 shows the brightness of two $CaCO_3$ samples as measured on a spectrophotometer, prepared by the process of this invention from sulfate green liquor. The final $CaCO_3$ was divided into two portions; one portion was dried at 105° C. with no bleaching and the other was bleached with 0.5% available chlorine before drying. A $CaCO_3$ made using a poor lime was deliberately selected for this example. FIG. 2 gives brightness curves for carbonates made using a good lime.

*Example 1*

A typical causticization, in accordance with the invention, was made in the following manner. A sulfate green liquor was filtered to remove suspended solids. Analysis of the green liquor in g./l. as $Na_2O$ was: $Na_2CO_3=88.3$, $Na_2S=24.0$, $NaOH=26.8$. A dry hydrated lime, 95% $Ca(OH)_2$, specific surface=35,000 was used. One liter of the green liquor contained $Na_2CO_3$ equivalent to 111 g. of the dry hydrate. Two liters of the green liquor were heated to 70° C. and 444 g. of the dry hydrate were added substantially all at once and the mixture stirred at 70° C. for 5 minutes. The entire mixture was transferred to a large filter and the liquid phase separated from the solid. Then 5 liters of green liquor at 70° C. were filtered through the cake, followed by 4 liters of water. The washed cake was removed from the filter and dispersed in water so as to give a slurry of about 40% solids. 50 ml. of a calcium hypochlorite solution containing 0.03 g./ml. available chlorine were added with mild agitation. After standing for 1 hour, residual chlorine was determined as 0.06 g. indicating that 0.25% chlorine, based on the weight of $CaCO_3$, had been consumed. The $CaCO_3$ slurry was filtered and dried at 105° C. FIG. 2 shows the spectrophotometric brightness curve for this $CaCO_3$. Other data are given below:

Specific surface of lime used _____ 35,000 cm.$^2$/g.
Specific surface of $CaCO_3$ _____ 28,000 cm.$^2$/g.
Brightness of $CaCO_3$ (450 m$\mu$) _____ 95.
Analysis of $CaCO_3$
    $CaCO_3$ _____ 98.0%.
    Free $Ca(OH)_2$ _____ 0.20%.
    Fe _____ 0.04%.
    Acid insolubles _____ 0.41%.
    $SiO_2$ _____ 0.22%.

*Example 2*

Another typical typical causticization, in accordance with the invention, was made as follows: A sulfate green liquor was filtered to remove suspended solids. Analysis of the green liquor in g./l. as $Na_2O$ was: $Na_2CO_3=84.0$, $Na_2S=22.8$, $NaOH=18.6$. One liter of the green liquor contained $Na_2CO_3$ equivalent to 100 g. of $Ca(OH)_2$. A lime slurry was prepared by adding 1000 g. of CaO to 5 l. of $H_2O$. After cooling, the slurry was screened through a 325 mesh screen and analyzed for $Ca(OH)_2$: 0.25 g./ml. were found. 1600 ml. of the slurry, 400 g. $Ca(OH)_2$, were dewatered by filtering; 2 l. of the green liquor were heated to 70° C. and the filter cake of $Ca(OH)_2$ was added substantially all at once to the green liquor and the mixture stirred for 5 minutes at 70° C. The entire mixture was transferred to a large filter and treated as in Example 1. Chorine consumed in bleaching was 0.15% on the weight of $CaCO_3$. FIG. 2 shows the spectrophotometric brightness curve for this $CaCO_3$. Other data follows:

Specific surface of lime used _____ 56,000 cm.$^2$/g.
Specific surface of $CaCO_3$ _____ 36,400 cm.$^2$/g.
Brightness of $CaCO_3$ (450 m$\mu$) _____ 98.
Analysis of $CaCO_3$:
    $CaCO_3$ _____ 98.5%.
    Free $Ca(OH)_2$ _____ 0.12%.
    Fe _____ 0.03%.
    Acid insolubles _____ 0.22%.
    $SiO_2$ _____ 0.15%.

*Example 3*

A typical preparation of $CaCO_3$ by the process of the invention from a $Na_2CO_3$ solution was carried out as follows. Using commercial soda ash a $Na_2CO_3$ solution was prepared of concentration 107 g./l. as $Na_2O$. One liter of this solution was heated to 70° C. and 256 g. of dry hydrate, $Ca(OH)_2$: $Na_2CO_3=2:1$, added substantially all at once. The mixture was agitated for 5 minutes at 70° C. and then transferred to a filter and the liquid phase separated from the solid phase. 2.5 l. of the $Na_2CO_3$ solution at 70° C. were passed through the cake on the filter followed by 3 l. of wash water. The cake was then dried at 105° C.

Specific surface of lime used _____ 28,000 cm.$^2$/g.
Specific surface of $CaCO_3$ _____ 22,000 cm.$^2$/g.
Brightness of $CaCO_3$ (450 m$\mu$) _____ 97.
Analysis of $CaCO_3$:
    $CaCO_3$ _____ 98.2%.
    Free $Ca(OH)_2$ _____ 0.20%.
    Fe _____ 0.04%.
    Acid insolubles _____ 0.15%.

*Example 4*

Figure 3:
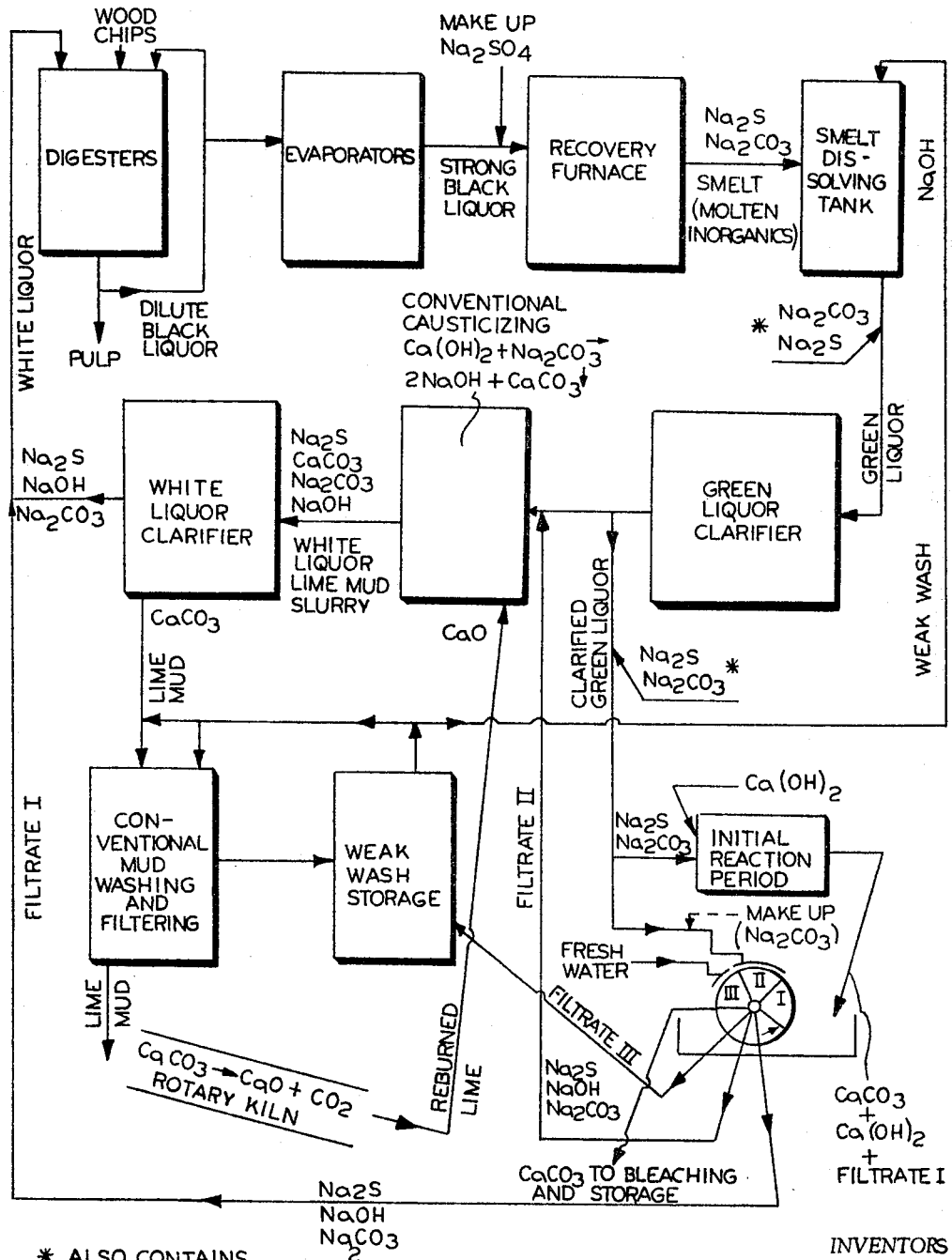
FIG. 3 is a flow diagram of a typical kraft process pulp mill into which $CaCO_3$ porduction in accordance with this invention has been integrated.

A process for manufacturing high quality $CaCO_3$ in accordance with this invention, integrated into the production of pulp by the sulfate process is illustrated in FIG. 3.

This pulp mill would produce during a typical 24 hour period approximately 225 tons of pulp from a variety of wood. This would require the use of approximately 250,000 gallons of white liquor which after use would be converted in the recovery system to approximately 225,000 gallons of green liquor. To convert this green liquor to white liquor would require the burning of approximately 125 tons of lime mud to produce the required amount of CaO (87.6% available).

For this mill to make 30 tons per day of high quality $CaCO_3$ over a 24 hour period in accordance with this invention would require the use of 22.2 tons of $Ca(OH)_2$ and 31.8 tons of $Na_2CO_3$ for stoichiometric proportions. We have found, however, that an amount of $Na_2CO_3$ which is approximately 1.75 times the stoichiometric amount is required. This increases the $Na_2CO_3$ requirements to 55.8 tons. The green liquor produced in the aforementioned kraft pulp mill contains on the average 1.22 lbs. of $Na_2CO_3$ per gallon. Therefore, 91,300 gallons of the pulp mill's green liquor or 40.6% of the total volume would be diverted to the $CaCO_3$ plant. This clarified green liquor should be filtered prior to use to remove suspended solids and thus ensure more consistent brightness of the $CaCO_3$ produced. Inorganic or organic flocculating agents can be used to aid the clarification process, and if the clarification system is adequate, there may be no need for supplemental filtration of the green liquor used for $CaCO_3$ manufacture.

In accordance with this invention, such a mill would continuously admix 30.8 lbs. of $Ca(OH)_2$ and 18.1 gallons of green liquor per minute as discussed in the description and continuously transfer the resulting mixture to a suitable mechanical device. For ease of explanation the example is based on the use of a rotary vacuum filter as said mechanical device. After the proper mat or cake has been formed on the filter, it would be treated with green liquor at the rate of about 45 gallons per minute by means of spray nozzles, weirs, etc. to complete the reaction and then washed with fresh water at the rate of 35 gallons per minute to remove undesirable soluble compounds. The washed cake could then be diluted to the desired solids (20%–50%) and pumped to a tank for bleaching and storage prior to use in the paper mill, or to drying and grinding, or to shipping to outside customers in slurry or paste form.

In the most simple embodiment of the invention, the filtrates removed by the filter would be segregated into three portions. The filtrate from filtering the mixture from the initial reaction, Filtrate I (containing about 29 g./l. $Na_2CO_3$ and 77 g./l. NaOH) is sent directly to the white liquor system where it would comprise about 10.5% of the total white liquor. Filtrate II, the carbonate liquor remaining after effecting the complete conversion of $Ca(OH)_2$ to $CaCO_3$ on the filter contains about 50 g./l. $Na_2CO_3$ and 60 g./l. NaOH and is returned to the normal causticizing operation for conversion to suitable white liquor. The wash filtrate, Filtrate III, is pumped to the weak wash system of the kraft mill from which it can be used for dissolving the smelt from the recovery furnace, or for washing the lime mud from the normal causticizing operation.

If it is desired to use $Na_2CO_3$ in the pulp mill as part of the chemical makeup to replace soda losses, a solution of $Na_2CO_3$ could be used as all or part of the carbonate solution required in the second phase on the filter. This possibility is indicated in dotted lines on FIG. 3.

In this embodiment, Filtrate II is of about 55% causticity and comprises about 30% of the total green liquor flow. In the normal causticizing operation it is recombined with the remaining 59.4% of the green liquor, of about 19% causticity, and there are added 52.8 tons of reburned lime (87.6% available CaO) made from about 89.2 tons of lime mud ($CaCO_3$), to convert the combined liquors to white liquor of about 85% causticity.

It is to be understood that the invention can be practiced with variations in the times, temperatures, ratios of reactants and other variables all of which are not narrowly critical. The following ranges are representative but not limiting. The ratio of chemical equivalents of total $Na_2CO_3$ to total $Ca(OH)_2$ used in the entire reaction representatively lies in the range of 1.4:1 to 5:1, although amounts of $Na_2CO_3$ in the upper portion of or above this range simply pass through the cake into the filtrate; the time for the initial reaction preferably lies between 2.5 to 10 minutes; the amount of alkali metal carbonate reacted during the initial reaction preferably is not more than 80% of that originally present in the initial reaction. Preferably 10 to 90% of calcium carbonate formation takes place in the mat, layer or filter cake after the initial reaction. The proportion of sodium carbonate employed in the initial reaction is representatively 10 to 90% of the total amount of sodium carbonate used in the entire reaction, thus leaving the proportion thereof used in the reaction on the mat layer or filter cake at 90 to 10%. The temperatures for the initial reaction and for the reaction in the mat, layer or cake representatively lies between about 20° and about 110° C. taking into account the boiling and freezing points of the solutions involved and the pressures or vacuums to which they are subjected. The thickness of the mat, layer or cake is usually about ¼ to about 2 inches and, of course, the mat, layer or cake should be porous enough to allow the alkali metal carbonate and resulting alkali metal hydroxide to pass through. It is also to be understood that unless otherwise specified all percentages are by weight and that any alkali metal carbonate can be employed wherever sodium carbonate is set forth herein. In this connection the present invention can be combined with pulping operations whether sodium based, potassium based or based on other alkali metal systems.

When integrated into a pulping system, it is preferred to employ from 15 to 80 percent of the green liquor of such system in the initial reaction and 85 to 20 percent in the reaction in the mat, layer or cake. It is also preferred to return the filtrate obtained in forming the mat, layer or cake to the digesters as a portion of the white liquor of the system and to return the filtrate resulting from the reaction in the mat, layer or cake to the causticization stage of the system. The amount of wash water employed to wash the mat, layer or cake after completion of conversion thereof to calcium carbonate representatively is from 0 to 400 percent of the weight of said mat, layer or cake and the filtrate from the wash operation can be used at any stage of the system wherein weak wash water is useful, e.g., in the lime mud washing stage, the smelt dissolving stage, etc.

We claim:

1. A continuous process for producing calcium carbonate comprising the steps of (1) continuously moving a mixture of calcium hydroxide and a first aqueous solution containing an alkali metal carbonate through a reaction zone to react said calcium hydroxide with not more than 80 weight percent of said alkali metal carbonate to form calcium carbonate, (2) continuously separating fluid from the mixture exiting from said reaction zone to form a filter cake, (3) contacting said filter cake with a second aqueous solution containing alkali metal carbonate to complete the conversion of calcium hydroxide to calcium carbonate and form alkali metal hydroxide, and removing alkali metal hydroxide from said cake during said contacting step, and (4) washing the resulting calcium carbonate with water.

2. The process of claim 1 in which the first and second aqueous solutions are green liquor from a sulfate pulp recovery operation.

3. The process of claim 1 in which said first aqueous solution is green liquor from a sulfate recovery operation and said second aqueous solution is an alkali metal carbonate solution containing less alkali metal sulfide than said first aqueous solution.

4. The process of claim 1 in which said alkali metal carbonate is sodium carbonate.

5. The process of claim 1 in which said resulting calcium carbonate is slurried with a third aqueous solution containing an alkali metal carbonate and steps (2) and (3) are repeated before proceeding with step (4).

6. The process of claim 1 in which said calcium carbonate from step (3) is separated and the remaining liquid is employed as said first aqueous solution.

7. The process of claim 5 in which said calcium carbonate from the repeated step (3) is separated and the remaining liquid is employed countercurrently as said third aqueous solution for slurrying the calcium carbonate.

8. In the system of puling ligneous cellulosic materials with alkali metal base cooking liquors, recovering spent cooking liquors to form green liquor containing alkali metal carbonate in aqueous solution, and causticizing said green liquor to convert same to white liquor for recycle to the pulping step, that improvement comprising, mixing a portion of said green liquor with calcium hydroxide, continuously moving the resulting mixture through a reaction zone to react said calcium hydroxide with not more than 80 weight percent of said alkali metal carbonate contained by said green liquor to form calcium carbonate, continuously separating fluid from the mixture exiting from said reaction zone to form a filter cake, and passing another portion of said green liquor through said filter cake to substantially completely convert the calcium hydroxide in said cake to $CaCO_3$ and form alkali metal hydroxide, and removing alkali metal hydroxide from said cake while passing said portion of green liquor through said cake.

9. The improvement as claimed in claim 8 wherein the liquid from said resulting mixture after separating $CaCO_3$ and calcium hydroxide therefrom to form said cake is recycled to said pulping step.

10. The improvement as claimed in claim 8 wherein the green liquor after passing through said filter cake is recycled to said first mentioned causticizing step.

11. A continuous process for producing calcium carbonate comprising the steps of (1) forming a mixture of calcium hydroxide and a first aqueous solution containing an alkali metal carbonate, (2) maintaining said mixture mobile while reacting said calcium hydroxide with not more than 80 weight percent of said alkali metal carbonate, (3) separating fluid from said mixture to form a filter cake, (4) contacting said filter cake with a second aqueous solution containing an alkali metal carbonate to complete the conversion of calcium hydroxide to calcium carbonate and form alkali metal hydroxide, and removing alkali metal hydroxide from said cake during said contacting step, and (5) washing the resulting calcium carbonate with water.

12. A continuous process for producing calcium carbonate comprising the steps of (1) mixing calcium hydroxide with a first aqueous solution containing an alkali metal carbonate to react said calcium hydroxide with not more than 80 weight percent of said alkali metal carbonate to form calcium carbonate, (2) separating fluid from said mixture to form a filter cake, and (3) contacting said filter cake with a second aqueous solution containing an alkali metal carbonate to complete the conversion of calcium hydroxide to calcium carbonate and form alkali metal hydroxide, and removing alkali metal hydroxide from said cake during said contacting step, at least 1.4 moles of alkali metal carbonate per mole of calcium hydroxide being employed in the entire process.

13. The process of claim 12 in which the first and second aqueous solutions are green liquor from a sulfate pulp recovery operation and the reaction of calcium hydroxide and alkali metal carbonate prior to contacting with said second aqueous solution takes place within a period not exceeding 15 minutes.

14. The process of claim 12 in which said first aqueous solution is green liquor from a sulfate recovery operation and said second aqueous solution is an alkali metal carbonate solution containing less alkali metal sulfide than said first aqueous solution.

15. The process of claim 12 in which said alkali metal carbonate is sodium carbonate.

16. The process of claim 12 in which said resulting calcium carbonate is slurried with a third aqueous solution containing an alkali metal carbonate and steps (2) and (3) are repeated.

17. The process of claim 12 in which said calcium carbonate from step (3) is separated and the remaining liquid is employed as said first aqueous solution.

18. The process of claim 16 in which said calcium carbonate from step (3) is separated and the remaining liquid is employed countercurrently as said third aqueous solution for slurrying the calcium carbonate cake.

19. A continuous process for producing calcium carbonate comprising the steps of (1) mixing calcium hydroxide with a first aqueous solution containing an alkali metal carbonate for a period of time sufficient to react not more than about 80 weight percent of said alkali metal carbonate with said calcium hydroxide to form calcium carbonate, (2) separating calcium carbonate and calcium hydroxide from the resulting mixture to form a filter cake, (3) contacting said filter cake with a second aqueous solution containing an alkali metal carbonate to convert the calcium hydroxide present in said cake to calcium carbonate to form a calcium carbonate cake and form alkali metal hydroxide, and removing alkali metal hydroxide from said cake during said contacting step, and (4) washing the resulting calcium carbonate.

20. A continuous process for producing calcium carbonate comprising the steps of (1) mixing calcium hydroxide with a first aqueous solution containing an alkali metal carbonate for a period of not more than 15 minutes to react said calcium hydroxide with not more than 80 weight percent of said alkali metal carbonate to form calcium carbonate, (2) separating fluid from said mixture to form a filter cake, (3) contacting said filter cake with a second aqueous solution containing an alkali metal carbonate to complete the conversion of calcium hydroxide to calcium carbonate and form alkali metal hydroxide, and removing alkali metal hydroxide from said cake during said contacting step, and (4) washing the resulting calcium carbonate.

References Cited by the Examiner

UNITED STATES PATENTS 2,062,255  11/1936  Brooks et al. _____ 23—66
2,211,908  8/1940   O'Connor _____ 23—66

OSCAR R. VERTIZ, *Primary Examiner.*

BENJAMIN HENKIN, *Examiner.*

G. OZAKI, *Assistant Examiner.*